United States Patent Office 3,684,437
Patented Aug. 15, 1972

3,684,437
CHLOROUS ACID PRODUCTION
Joseph Callerame, Rochester, N.Y., assignor to Chemical Generators Inc., Rochester, N.Y.
No Drawing. Continuation-in-part of application Ser. No. 817,056, Apr. 17, 1969. This application Sept. 14, 1970, Ser. No. 72,122
Int. Cl. C01b 11/02, 11/00, 7/00
U.S. Cl. 423—472    6 Claims

ABSTRACT OF THE DISCLOSURE

Pure chlorous acid is produced by ion exchange between a mixed cation-anion exchange resin and a chlorite of an alkali metal or an alkaline earth metal. Gaseous chlorine dioxide may be liberated from the resulting chlorous acid solution by heating.

CROSS-REFERENCE TO PRIOR APPLICATION

This is a continuation-in-part of co-pending application Ser. No. 817,056, filed on Apr. 17, 1969, now abandoned.

FIELD OF INVENTION

This invention generally relates to chlorous acid production and is particularly directed to a new procedure for producing chlorous acid solutions from which chlorine dioxide may be readily liberated by heating.

BACKGROUND INFORMATION AND PRIOR ART

Chlorine dioxide is of considerable industrial importance and has found use in the bleaching of wood pulp, fats, oils and flour. Generally, chlorine dioxide is used as a bleaching agent and for removing undesirable tastes and odors from water and the like liquids. More recently it has been used as an anti-pollutant. The use of chlorine dioxide is particularly popular in swimming pools. For several of the established uses of the chlorine dioxide, it is desirable to produce the gas in situ so that the chlorine dioxide, upon formation, can be directly put to use either in gaseous form or, after absorption, in the form of an aqueous solution. In many instances, the use of chlorine dioxide in solution rather than in gaseous form is preferred. Since chlorine dioxide absorbed in water forms chlorous acid, from which the gas can be readily expelled by heating, chlorine dioxide and chlorous acid are for all practical purposes the same thing.

Accordingly, it is the primary object of the present invention to provide for a procedure by means of which chlorine dioxide or chlorous acid is selectively produced in situ.

It has previously been proposed to produce chlorine dioxide by subjecting an aqueous lithium chlorite solution to electrolysis in a cell, wherein the anode is separated from the cathode by a semi-permeable membrane. The previous proposal is thus based on electrical migration through a semi-permeable membrane resulting in dissociation of the lithium chlorite molecule. By contrast, the present invention is predicated on the novel realization that lithium chlorite and the other alkali metal chlorites as well as the alkaline earth metal chlorites are capable of forming chlorous acid by ion exchange. If an aqueous solution of an alkali metal chlorite or an alkaline earth metal chlorite is thus passed through an ion exchange column, for example, in a constant flow continuous system, the ion exchange column containing a cation ion exchange resin in the hydrogen form and an anion ion exchange resin in strong base form, a pure chlorous acid solution of high yield is obtained. The chlorine dioxide may of course be readily expelled from the acidic solution by mere heating.

Any cation exchange resin can be used for the inventive purposes, provided its active sites are occupied by hydrogen, since, as it will become apparent from the above, the inventive procedure is predicated on what is termed in the art as hydrogen exchange in which the metal ion of the chlorite solution is replaced by hydrogen ion. It has also been ascertained that the inventive procedure can be successfully performed with so-called semiconducting resins in which the ion exchange is based on electrical phenomena.

Successful operation of the inventive procedure, however, also requires the presence of an anion exchange resin in the hydroxide or other strong base form, since in the absence of the anion exchange resin a poor yield is obtained and the resulting chlorous acid solution is not pure and rapidly deteriorates. The anion exchange resin not only purifies the water in the system of anions but also exerts catalytic activity. The ratio of cation to anion exchange resin should be between 95:5 and 60:40. The best results are obtained if the pH of the solution is between 6.2–7.0, preferably between 6.5–7.0, thereby preventing rapid deterioration of $ClO_2$.

Although applicant does not wish to be limited by any theories advanced by him, it is believed that the ion-exchange reaction takes place according to the following scheme:

$$XClO_2 + H^+ \rightarrow HClO_2 + X \text{ (absorbed)}$$

wherein X is an alkali metal or alkaline earth metal.

The inventive ion exchange reaction can be performed under anhydrous conditions as will become apparent from the subsequent description.

The temperature for conducting the ion exchange reaction is not critical although the most favorable results are obtained in a temperature range of 15–65° C.

No byproducts or contaminants are formed in the inventive reaction and a pure chlorous acid solution is obtained at the bottom of the exchange column. This solution may be used directly or, if the gaseous chlorine dioxide is preferred, the solution may be heated to expel the gas.

When the column has reached its exhaustion point or is near exhaustion, it may be readily regenerated by a strong or weak acid so as to exchange the alkali metal or alkaline earth metal at the active sites of the cation exchange resin for hydrogen. The anionic exchange resin may, in turn, be regenerated by e.g. sodium or potassium hydroxide.

Because of the extreme simplicity of the inventive procedure, yield measurements are very simple to conduct and are most accurate. In the following examples, production losses in the yield measurements were neglected since the time differential between the production and the measurement was negligible.

The invention will now be described by several examples, it being understood, however, that these examples are given by way of illustration and not by way of limitation and that many changes may be effected without affecting in any way the scope and spirit of the invention as recited in the appended claims.

EXAMPLE 1

An aqueous sodium chlorite solution containing 4.1 gram of $NaClO_2$ in 50 ml. of water was passed through an ion exchange column containing a mixed bed of cation and anion exchange resin. The particular resins used in this experiment, were of the Dowex (trademark) series but any strong acidic cation exchange resin and any basic anion exchange resin can be used. The specific cation exchange resin used in this experiment was Dowex 50 W–X 12. The sodium chlorite solution was passed through the resin bed at a temperature of about 37° C. and at atmospheric pressure. In other words, the solution was not pumped or forced through the resin bed but it was permitted to trickle through the resin by gravity. The column contained a storage chamber at its lower exit end and the solution was contained in the chamber after having passed through the resin bed. The column was then rinsed with double distilled water and the eluant was also contained in the chamber. The combined liquids were then diluted to one liter with double distilled water and its wave length was read in a Beckman DU against a standard curve at 340 m$\mu$. The reading was 20% T or 0.699 OD.

Calculations: Since the solution, which was passed through the column, contained 4.1 g. of sodium chlorite in 50 ml. of water, the theoretical yield of $ClO_2$ is 2.75 g. The actual yield, calculated from the OD was 2.69 g., corresponding to 97.8%.

No free chlorine could be detected in the solution.

EXAMPLE 2

An aqueous solution of both sodium chlorite and lithium chlorite was passed through the same column after it had been regenerated with hydrochloric acid and sodium hydroxide. The solution contained 2.0 g. of $NaClO_2$ and 1.1 g. of $LiClO_2$. While the theoretical yield would have been 2.53 g., the actual yield was 2.49 g., corresponding to a percentage yield of 98.5.

EXAMPLE 3

An aqueous solution containing the chlorites of sodium, lithium, barium and calcium in combination was passed through the column described in Example 1. The theoretical yield would have been 4.28 g. while the actual yield was 4.17 g., corresponding to a percentage yield of 97.5%.

EXAMPLE 4

Example 1 was repeated in a column having a narrow inlet and a narrow exit so as to permit the build up of pressure. An air compressor was connected to the column, the air compressor having a capacity of 25 p.s.i. The air intake was adjusted to permit a constant pressure build up in the column of 20 p.s.i. It was established that the yield was not affected by conducting the procedure under pressure.

EXAMPLE 5

The test of Example 1 was repeated at different temperatures, varying from 14 to 65° C. No change in the percentage yield could be observed, which indicates that the temperature, if kept within a reasonable range, does not affect the process. At higher temperatures, to wit, temperatures above 65° C. the evolution of chlorine dioxide from the resulting chlorous acid solution became visible and the percentage yield of chlorous acid in the solution was decreased with an increase of temperature. By contrast, at lower than 14° C. temperatures, ice crystals, which formed in the column, interfered with the passage of the solution through the column and temperatures below 15° C. are therefore not recommended.

The amount of resin in the column is of course of no importance, provided that sufficient active hydrogen sites are available to permit for a complete exchange of the metal ion by hydrogen. Knowing the amount of chlorite in the solution, the amount of resin can of course be readily calculated.

Although, as previously stated, any cation or hydrogen exchange resin can be used for the inventive purposes, the above experiments were carried out with a three dimensional high molecular weight polymer resin having strong acid groupings. This type of resin can be regenerated any number of times, which is of particular importance in conducting continuous or semi-continuous processes in which recycling is desired. This may be of an economical advantage.

It is also feasible to use water soluble resins of the gum type. In such a case, however, it would of course be necessary to interpose a separation stage to separate the chlorous acid or chlorite dioxide from the gum. This can be done by heating.

EXAMPLE 6

An aqueous solution of sodium chlorite was passed through a fluted filter, coated with a film of the molecular crystals formed by the combination of tetracyanoquinodimethane with poly-N-methylvinylpyridinium. This is a semi-conducting resin of the kind of which many are available on the market. The resin coating on the filter paper caused exchange of the sodium ion for hydrogen in the same manner as in the experiments carried out with conventional ion exchange resins. As will be appreciated, the exchange in this experiment is based on electrical phenomena.

EXAMPLE 7

This example is concerned with the formation of chlorous acid under dry exchange conditions. 5 g. of sodium chlorite were placed into a sealed stainless steel container defining a chamber. The chamber had a valve controlled air inlet and was connected to a vacuum pump. 5 g. of mixed resin were than introduced into the chamber and the air, which was sucked by the pump through the inlet, was continuously evacuated into a receptacle filled with double distilled water. The container was rotated. The evacuation of the chamber was necessary in order to prevent build up of a high chlorine dioxide concentration in the chamber which otherwise might cause explosion. The receptacle was fitted with a thermometer which dropped by 6 degrees during the absorption of the gas emanating from the chamber in the water. The water in the receptacle turned yellow green. The reaction chamber was opened after 10 minutes. No chlorine dioxide odor could be detected. The water in the receptacle was diluted to one liter and OD determination was effected. Compared to a standard curve in a Beckman instrument, a yield of 81% of chlorous acid was noted. Analysis of the resin revealed the presence of a high sodium concentration and also the presence of chlorate.

EXAMPLE 8

The preceding experiment was repeated with a semiconducting resin resulting in a comparable yield.

The following examples demonstrate the importance of the presence of the anionic resin, since chlorous acid production obtained by exchange through a cation exchange column does not result in a pure solution and deteriorates rapidly.

EXAMPLE 9

A 1.5% solution of sodium chlorite is fed through a cation exchange resin (Dowex-hydrogen only exchange resin) at the rate of 1 ml./minute.

By standard methods the following assay of ingredients was found in the resulting exchanged solution.

| | Percent |
|---|---|
| Total chlorine equivalent | 0.9 |
| $ClO_2^-$ | 0.3 |
| $OCl^-$ | 0.3 |
| HCl | 0.3 | pH 6.3.

The above experiment was repeated using a 1.0% solution of sodium chlorite.

| | Percent |
|---|---|
| Total chlorine equivalent | 0.70 |
| $ClO_2^-$ | 0.43 |
| $OCl^-$ | 0.11 |
| HCl | 0.16 | pH 6.3.

The experiment was repeated using a 2.0% solution of sodium chlorite.

| | Percent |
|---|---|
| Total chlorine equivalent | 1.1 |
| $ClO_2$ | 0.33 |
| $OCl$ | 0.40 |
| $HCl$ | 0.37 | pH 6.3.

It will thus be noted that the solution is contaminated by HCl and OCl.

EXAMPLE 10

The deterioration of $ClO_2$ is promoted by either lengthening the exchange column or increasing the exchange period.

A 1.5% solution of sodium chlorite is fed through a cation exchange column so as to effect a rate of 0.5 ml./minute.

The following assay was reported on the exchanged solution.

| | Percent |
|---|---|
| Total Cl equivalent | 1.54 |
| $ClO_2$ | 0.77 |
| $OCl$ | 0.41 |
| $HCl$ | 0.36 | pH 6.3.

The above solution was fed so as to effect a rate of 0.25 ml./minute:

| | Percent |
|---|---|
| Total chlorine equivalent | 0.90 |
| $ClO_2$ | 0.08 |
| $OCl$ | 0.50 |
| $HCl$ | .32 |

A 1.5% solution was fed through an exchange column at the rate of 0.1 ml./minute.

Assay of resulting solution:

| | Percent |
|---|---|
| Total Cl equivalent | 0.72 |
| $ClO_2$ | 0.05 |
| $OCl$ | 0.35 |
| $HCl$ | 0.32 | pH 6.2.

It follows from these experiments that if a cation exchange resin in the hydrogen form is used in the absence of an anion exchange resin (1) A pure $ClO_2$ solution is not produced;
(2) The hydrogen exchange, if prolonged, could conceivably produce no $ClO_2$ at all;
(3) An extremely low yield of $ClO_2$ is produced.

EXAMPLE 11

The addition of an anion exchange resin to the cation exchange column.

A column of exchange resin is built containing 10% anion and 90% cation exchange resins. The resins were shaken prior to packing to effect a homogeneous column.

A 2% solution of sodium chlorite was fed through the column at a rate of 0.1 ml./minute.

| | Percent |
|---|---|
| Total chlorine equivalent | 2.61 |
| $ClO_2$ | 1.3 |
| $OCl$ | 1.3 |
| $HCl$ | Slight trace | pH 6.7.

A 0.2% solution of sodium chlorite is fed through the column as above

| | Percent |
|---|---|
| Total chlorine equivalent | 0.14 |
| $ClO_2$ | 0.14 |
| $OCl$ | 0 |
| $HCl$ | 0 |

Assay pH 6.9.

Different exchange columns were packed with varying ratios of cation to anion exchange resin. The following table shows the results obtained at different ratios of resins.

| Chlorite solution concentration, percent | Cation/anion | Total chlorine equivalent percent | $ClO_2$, percent | $OCl$ | $HCl$ | pH |
|---|---|---|---|---|---|---|
| 2 | 95/5 | 1.2 | 1.1 | 0.05 | 0.05 | 6.45 |
| 0.2 | 95/5 | 0.13 | 0.11 | 0.01 | 0.01 | 6.45 |
| 2 | 85/15 | 1.3 | 1.3 | 0 | 0 | 6.7 |
| 0.2 | 85/15 | 0.14 | 0.13 | 0 | 0.01 | 6.75 |
| 2 | 80/20 | 1.4 | 1.4 | 0 | 0 | 6.8 |
| 0.2 | 80/20 | 0.14 | 0.13 | 0 | 0 01 | 6.8 |
| 2 | 70/30 | 1.5 | 1.5 | 0 | 0 | 6.85 |
| 0.2 | 70/30 | 0.151 | 0.15 | 0 | Trace | 6.9 |
| 2 | 60/40 | 1.4 | 1.4 | 0 | 0 | 6.9 |
| 2 | 50/50 | 1.3 | 1.3 | 0 | 0 | 6.95 |
| 2 | 40/50 | 1.0 | 1.0 | 0 | 0 | 7.0 |
| 2 | 30/50 | 0.8 | 0.8 | 0 | 0 | 7.2 |

It follows that a high yield of $ClO_2$ is initially produced (1) by the presence of an anion exchange resin in admixture with a cation exchange resin; (2) by the stabilization of the pH between 6.5–6.95; the purity of the $ClO_2$ solution is very satisfactory and above 90%. Long contact time does not appear to effect deterioration in a mixed resin column.

Effect of chlorite concentration on the yield percentage.

| Chlorite solution concentration, percent | Percent yield recovery | Resin concentration, cation:anion |
|---|---|---|
| 0.2 | 94 | |
| 1.0 | 95 | |
| 2.0 | 93 | |
| 3.0 | 94 | Optimum |
| 4.0 | 93 | area. |
| 6.0 | 94 | |
| 8.0 | 94 | |
| 10.0 | 93 | 80/20 throughout. |
| 12.0 | 91 | |
| 14.0 | 90 | |
| 18.0 | 87 | |
| 22.0 | 72 | |

EXAMPLE 12

Even more apparent is the effect of the exchange resin mixture in producing $ClO_2$ without the use of water as the carrier.

The procedure of Example 7 was repeated but only a cation exchange resin and no anion exchange resin was used. As in Example 7, a dry $ClO_2$ sample was processed.

Result:

| Chlorite wt., gram | Resin concentration, cation/anion | Percent HCl | Percent $ClO^2$ | Percent Chlorine equivalent |
|---|---|---|---|---|
| 5 | 100/0 | 3.6 | 0.4 | 4.0 |
| 10 | 100/0 | 6.3 | 1.7 | 8.0 |
| 20 | 100/0 | 13.0 | 2.0 | 15.0 |
| 5 | 80/20 | 0 | 4.0 | 4.0 |
| 10 | 80/20 | 0.5 | 7.5 | 8.0 |
| 20 | 80/20 | 1.0 | 13.5 | 14.5 |

It will be appreciated from the above that in accordance with the inventive procedure the chlorite group dissociates to its chlorine dioxide component in an exceedingly simple manner. This dissociation is utilized in accordance with the invention in the form of a very economic method for the production of chlorine dioxide or chlorous acid.

The equipment requirements are very minor and the yield is excellent. The inventive procedure can be used remote from power sources and does not need any expert skill for operation.

What is claimed is:

1. A process of preparing substantially pure chlorous acid of high yield, which comprises flowing aqueous solution of the chlorite of an alkali metal or alkaline earth metal at a pH value of between about 6.2 and 7.0 through an ion exchange column containing a mixture of a cation exchange resin, the active sites of which are occupied by hydrogen and an anion exchange resin, the active sites of which are occupied by hydroxyl, the ratio of cation resin to anion resin in the mixture being between about 95:5 and 60:40, and collecting chlorous acid solution at the bottom of the column.

2. A process as claimed in claim 1, wherein said chlorous acid solution is heated to liberate chlorine dioxide.

3. A process as claimed in claim 1, wherein the procedure is carried out in a temperature range of between about 15 to 65° C.

4. A process as claimed in claim 1, wherein the concentration of the chlorite solution is between about 0.2–20% by weight.

5. A process of forming substantially pure chlorous acid of high yield which comprises mixing in a sealed chamber a mixture of cation exchange resin, whose active sites are occupied by hydrogen, and an anion exchange resin whose active sites are in strong base form, with a dry chlorite of an alkali metal or alkaline earth metal, the ratio of cation resin to anion resin in the mixture being between about 95:5 and 60:40, whereby gases are formed in said chamber, exhausting the gases formed in said chamber into a water filled receptacle to absorb said gases in said water, whereby an aqueous chlorous acid solution is obtained.

6. A process as claimed in claim 5, wherein the anionic resin is in the OH form.

References Cited
FOREIGN PATENTS 791,680   3/1958   Great Britain _____ 23—152

EDWARD STERN, Primary Examiner

U.S. Cl. X.R.

423—477